United States Patent
Han

(10) Patent No.: US 6,987,362 B2
(45) Date of Patent: Jan. 17, 2006

(54) CRT DISPLAY APPARATUS AND CONTROL METHOD THEREOF

(75) Inventor: Seok-joo Han, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 10/795,250

(22) Filed: Mar. 9, 2004

(65) Prior Publication Data

US 2005/0001553 A1    Jan. 6, 2005

(30) Foreign Application Priority Data

Jul. 3, 2003    (KR) ...................... 10-2003-0044898

(51) Int. Cl.
  *H01J 31/26* (2006.01)
  *H01J 29/06* (2006.01)
  *G09G 5/02* (2006.01)

(52) U.S. Cl. ............................. 315/10; 315/8; 345/589

(58) Field of Classification Search ............. 315/8, 315/364, 368.11, 386, 383, 10; 348/687; 345/589, 207, 690
See application file for complete search history.

(56) References Cited

U.S. PATENT DOCUMENTS

| | | | | |
|---|---|---|---|---|
| 4,942,341 A | * | 7/1990 | Imaizumi | ..................... 315/403 |
| 5,400,086 A | * | 3/1995 | Sano et al. | ................... 348/678 |
| 5,619,285 A | * | 4/1997 | Kobayashi | .................. 348/806 |
| 5,841,486 A | * | 11/1998 | Ando et al. | ................. 348/673 |
| 6,002,380 A | * | 12/1999 | Lee | .............................. 345/13 |
| 6,091,397 A | * | 7/2000 | Lee | ............................. 345/690 |
| 6,483,517 B1 | * | 11/2002 | Kang | .......................... 345/589 |
| 6,870,576 B2 | * | 3/2005 | Park | ........................... 348/673 |
| 2004/0000874 A1 | * | 1/2004 | Lee | ................................ 315/8 |
| 2004/0080286 A1 | * | 4/2004 | Moribe | ....................... 315/386 |

FOREIGN PATENT DOCUMENTS

| | | |
|---|---|---|
| JP | 5-199425 | 8/1993 |
| JP | 5-347717 | 12/1993 |
| JP | 9-46543 | 2/1997 |
| KR | 0147862 | 3/1996 |
| KR | 1999-5563 | 1/1999 |
| KR | 2001-54367 | 7/2001 |
| KR | 2001-83406 | 9/2001 |

* cited by examiner

*Primary Examiner*—Wilson Lee
*Assistant Examiner*—Angela M Lie
(74) *Attorney, Agent, or Firm*—Staas & Halsey LLP

(57) ABSTRACT

A CRT display apparatus having an FBT amplifying an inputted voltage and outputting the amplified voltage to an anode of a CRT, a vertical regulator to regulate a V-size of a screen, and a vertical deflector to vertically deflect a scanning line, further comprises a brightness change sensor to sense a voltage applied to an input terminal of a secondary induction coil provided in the FBT, and to output a sensed signal to the vertical regulator; and a brightness change compensator to output a compensating value to the vertical regulator based on the voltage applied to the input terminal, a frequency of the scanning line, and a specification size of the screen to compensate a brightness change. With this configuration, a V-size fluctuation due to a brightness change is minimized in the CRT display apparatus.

17 Claims, 4 Drawing Sheets

CRT DISPLAY APPARATUS AND CONTROL METHOD THEREOF

CROSS-REFERENCE TO RELATED APPLICATIONS

This application claims the benefit of Korean Patent Application No. 2003-44898, filed Jul. 3, 2003, in the Korean Intellectual Property Office, the disclosure of which is incorporated herein by reference.

BACKGROUND OF THE INVENTION

1. Field of the Invention

The present invention relates to a cathode ray tube (CRT) display apparatus and a control method thereof.

2. Description of the Related Art

In a conventional CRT display apparatus, a fly back transformer (FBT) outputs a voltage of about 26 kV. To supply such a high voltage stably, the FBT commonly uses two types of high-voltage stabilization circuits, one type being a separated-type circuit in which transformation and deflection are separated, and the other type being an incorporated-type circuit in which the transformation and the deflection are integrated.

FIG. 1 is a circuit diagram illustrating an input side of a secondary induction coil of the FBT having the incorporated type high-voltage stabilization circuit in the conventional CRT display apparatus.

As shown in FIG. 1, the conventional CRT display apparatus comprises an FBT 100, a horizontal regulating circuit 110, an auto beamcurrent limit (ABL) adjusting circuit 120, and a vertical regulating circuit 130.

The FBT 100 includes a primary induction coil 101 and a secondary induction coil 102. The secondary induction coil 102 has an output terminal electrically connected to a CRT, and an input terminal 116 electrically connected to the horizontal regulating circuit 110, the ABL adjusting circuit 120, and the vertical regulating circuit 130. In the FBT 100, a voltage applied to the primary induction coil 101 is amplified in the secondary induction coil 102, and then the amplified voltage is supplied to an anode of the CRT. Here, a voltage of about 50 to 180 V is applied from a step-up circuit to the primary induction coil 101, inducing a high voltage of about 25 kV in the secondary induction coil 102.

The horizontal regulating circuit 110 includes resistors R2 and R3, a diode D2, and a micro control unit (MCU) (not shown). When the voltage applied to the input terminal 116 fluctuates according to brightness of a screen, the horizontal regulating circuit 110 provides feedback due to the voltage fluctuation by using passive elements such as the resistors R2 and R3 to a horizontal size (H-size) control part. Further, the MCU compensates a predetermined value for the voltage fluctuation. Here, the compensated value in the MCU is transmitted to the H-size control part according to the voltage fluctuation with an average value based on an operating frequency of a scanning line according to the CRT display apparatus, wherein the average value is taken from experimental data.

The ABL adjusting circuit 120 includes a diode D4, and resistors R8 and R9. The ABL adjusting circuit 120 detects the voltage fluctuation at the input terminal 116 through the resistors R8 and R9 and the diode D4, and controls a beamcurrent being supplied to the CRT.

The vertical regulating circuit 130 comprises resistors R4, R5, R6 and R7 and diodes D1 and D3. The vertical regulating circuit 130 determines a voltage at a node 117 by comparing a voltage of 12 V applied to the resistor R5 with the voltage applied to the input terminal 116, and the voltage at the node 117 is fed back to an H/V processor to generate a current in a vertical deflection coil. Here, the H/V processor 130 regulates an amplitude of the current flowing in the vertical deflection coil, thereby controlling a vertical size (V-size) of the screen.

When the screen is changed in the brightness, electrons colliding with RGB (Red, Green, Blue) pixels are changed in energy. As the brightness of the screen increases, a higher energy of electrons is required, that is, a higher current is required. Because the FBT is supplied with constant power, when the current flowing in the secondary induction coil 102 is high, the voltage applied to the input terminal 116 is decreased.

Thus, the change of the brightness of the screen is determined by sensing the change of the voltage applied to the input terminal 116 of the secondary induction coil 102.

In the incorporated type high-voltage stabilization circuit, when the brightness of the screen increases, the voltage supplied to the anode of the CRT increases but the currents flowing in the horizontal and vertical deflection coils decrease. Further, when the currents flowing in the deflection coils decrease, the horizontal size (H-size) and the vertical size (V-size) of the screen are decreased. Therefore, when a display mode of the screen is altered among a text mode, an internet mode, a game mode, an entertainment mode, etc., the size of the screen suddenly and widely fluctuates. Particularly, in the CRT display apparatus for a monitor provided with a hot key to directly control the brightness of the screen, the size fluctuation of the screen due to the brightness change is more noticeable.

Recently manufactured monitors typically have a brightness of about 120 candela per square meter ($cd/m^2$), which is generally lower than that of a television (TV) screen, so that the monitor cannot display a picture more brightly than the TV. To overcome this problem, a CRT display apparatus having a picture boost function to display a picture with the brightness of about 500 $cd/m^2$ has been developed.

To compensate the H-size fluctuation of the screen due to the brightness change, a sawtooth wave generating circuit is provided with horizontal regulating parts in addition to the horizontal regulating circuit 110 of FIG. 1. Meanwhile, a vertical regulator only senses the voltage change, so that the V-size fluctuation due to the brightness change is not precisely compensated in comparison with the H-size fluctuation. Further, the MCU of the horizontal regulating circuit 110 compensates the H-size of the screen with an average value based on several CRT display apparatuses, so that size-compensation deviation may occur among the CRT display apparatuses.

SUMMARY OF THE INVENTION

Accordingly, an aspect of the present invention is to provide a CRT display apparatus and a control method thereof, which has an active regulating part to compensate the V-size of a screen according to a brightness change of the screen.

The foregoing and/or other aspects of the present invention are achieved by providing a CRT display apparatus having a flyback transformer (FBT) which amplifies an input voltage and outputs the amplified voltage to an anode of a CRT; a vertical regulator which regulates a vertical size of a screen of the CRT; a vertical deflector which vertically deflects a scanning line, the CRT display apparatus further comprising a brightness change sensor which senses a voltage applied to an input terminal of a secondary induction coil provided in the FBT and outputs a sensed signal to the vertical regulator; and a brightness change compensator which outputs a compensating value to the vertical regulator based on the voltage applied to the input terminal, a frequency of the scanning line, and a specification size of the screen, to compensate a brightness change.

According to an aspect of the invention, the compensating value from the brightness change compensator is inversely proportional to the voltage applied to the input terminal, and is directly proportional to the frequency of the scanning line and to a circuit constant relative to the specification size of the screen.

According to an aspect of the invention, the brightness change compensator comprises an amplifier which amplifies the voltage applied to the input terminal of the secondary induction coil, and outputs the compensating value which is calculated as follows:

$$Y = Xf + \frac{A}{Vin},$$

where, Y is a final compensating value output from the brightness change compensator, Xf is a compensating value according to the frequency of the scanning line, A is a constant relative to the specification size of the screen and a circuit characteristic, and Vin is the voltage output from the amplifier.

According to an aspect of the invention, the CRT display apparatus further comprises a frequency elector which outputs the frequency of the scanning line to the brightness change compensator based on the frequency of the scanning line selected by a user.

According to an aspect of the invention, the vertical regulator regulates an amplitude of a sawtooth wave current flowing in the vertical deflector according to signals received from the brightness change sensor and the brightness change compensator to prevent fluctuations of the vertical size of the screen.

According to another aspect of the prevent invention, the above and/or other aspects are also achieved by providing a method of controlling a CRT display apparatus having a flyback transformer (FBT) which amplifies an input voltage and outputs the amplified voltage to an anode of a CRT, and a vertical deflector which vertically deflects a scanning line, the method comprising: sensing a voltage applied to an input terminal of a secondary induction coil provided in the FBT; and compensating a brightness change of a screen of the CRT based on the sensed input voltage, a frequency of a scanning line and a specification size of the screen of the CRT.

According to an aspect of the invention, the method further comprises amplifying the sensed input voltage and compensating the brightness based on a compensating value which is calculated according to an equation:

$$Y = Xf + \frac{A}{Vin},$$

where, Y is a final compensating value, Xf is a compensating value according to the frequency of the scanning line, A is a constant relative to the specification size of the screen and a circuit characteristic of the CRT display, and Vin is the amplified voltage.

According to an aspect of the invention, the method further comprises providing a user operable input to select the frequency of the scanning line; and compensating the brightness based on a user selected frequency of the scanning line.

According to an aspect of the invention, the method further comprises regulating an amplitude of a sawtooth wave current flowing in the vertical deflector based on the sensed input voltage and the calculated compensating value to prevent the vertical size of the screen from fluctuating.

Additional aspects and advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
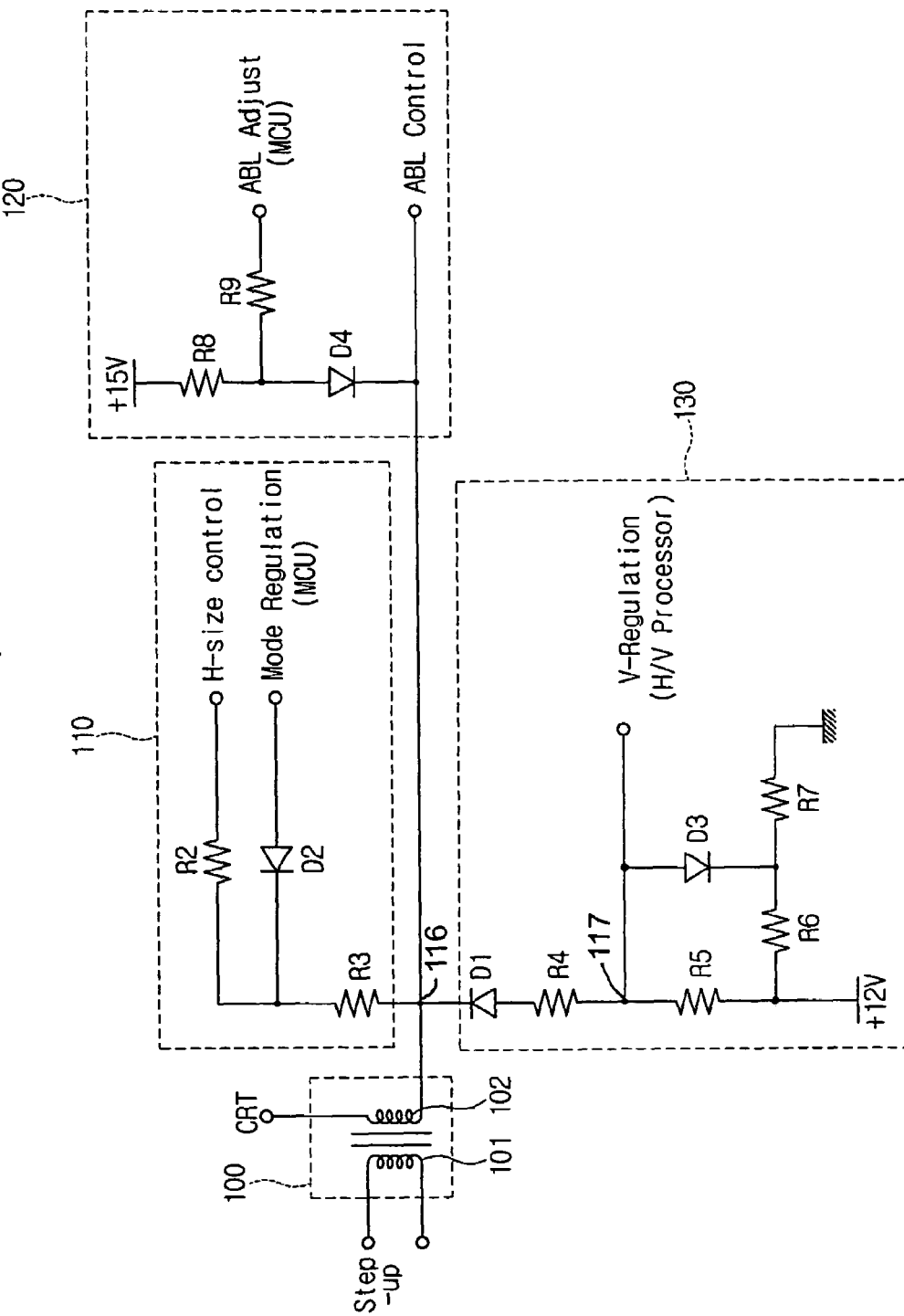
FIG. 1 is a circuit diagram illustrating a secondary induction coil of an FBT having an incorporated type high-voltage stabilization circuit in a conventional CRT display apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
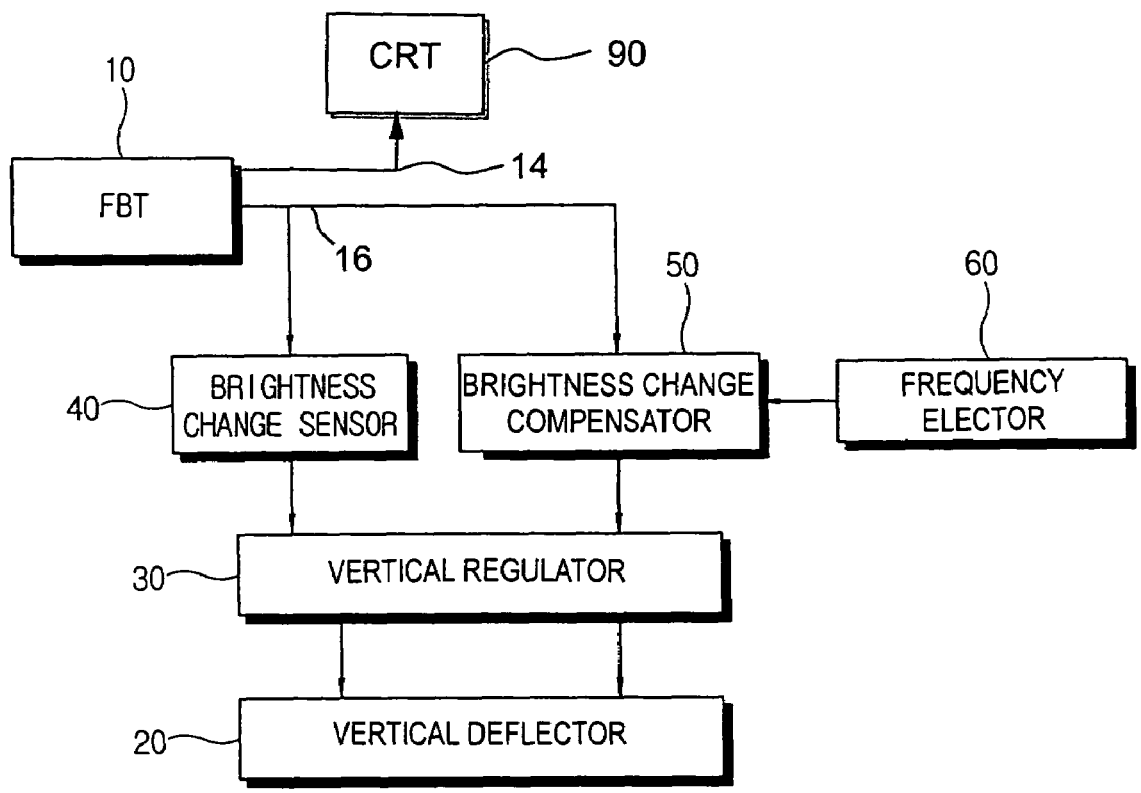
FIG. 2 is a block diagram of a CRT display apparatus according to the present invention.

FIG. 2 is a block diagram of a CRT display apparatus according to an embodiment of the present invention. As shown in FIG. 2, the CRT display apparatus comprises an FBT 10, a vertical deflector 20, a vertical regulator 30, a brightness change sensor 40, a brightness change compensator 50, and a frequency elector 60.

The FBT 10 comprises a first induction coil and a secondary induction coil, wherein the secondary induction coil has an output terminal 14 electrically connected to a CRT 90, and an input terminal 16 electrically connected to the brightness change sensor 40 and the brightness change compensator 50. In the FBT 10, a voltage applied to the primary induction coil is amplified in the secondary induction coil, and then supplied to an anode of the CRT 90. Here, a voltage of 50 to 180 V is applied from a step-up circuit to the primary induction coil, inducing a high voltage of about 25 kV in the secondary induction coil.

The vertical deflector 20 comprises a vertical deflection coil to vertically deflect an electron beam. The vertical regulator 30 comprises a horizontal/vertical (H/V) processor to output a sawtooth wave current to the vertical deflection coil in response to a control signal.

The brightness change sensor 40 senses the voltage applied to the input terminal 16 of the secondary induction coil by using a passive element such as, for example, a resistor, and outputs the sensed voltage value to the vertical regulator 30.

The brightness change compensator 50 outputs a nonlinear compensating value relative to a brightness change to the vertical regulator 30 in consideration of an operating frequency of a scanning line, a specification size of a screen, and the voltage applied to the input terminal of the secondary induction coil.

The frequency elector 60 outputs a frequency selection signal to the brightness change compensator 50 through a hot key provided in the CRT display apparatus to select the frequency of the scanning line.

As a picture displayed on the screen is changed in the brightness, the voltage applied to the secondary induction coil of the FBT 10 fluctuates. Particularly, when the voltage applied to the secondary induction coil decreases as the screen gets brighter, the voltage fluctuation is transmitted to the brightness change sensor 40 and the brightness change compensator 50. On the basis of the transmitted voltage fluctuation, the brightness change sensor 40 and the brightness change compensator 50 output a sensed signal and the compensating value, respectively, as control signals to the vertical regulator 30 to maintain the vertical size of the screen. The vertical regulator 30 increases the sawtooth wave current on the basis of the received control signals, and output the sawtooth wave current to the vertical deflection coil of the vertical deflector 20.

When a user changes the operating frequency of the scanning line through the frequency elector 60, the frequency elector 60 outputs information on the changed frequency to the brightness change compensator 50, thereby changing the compensating value.

Figure 3:
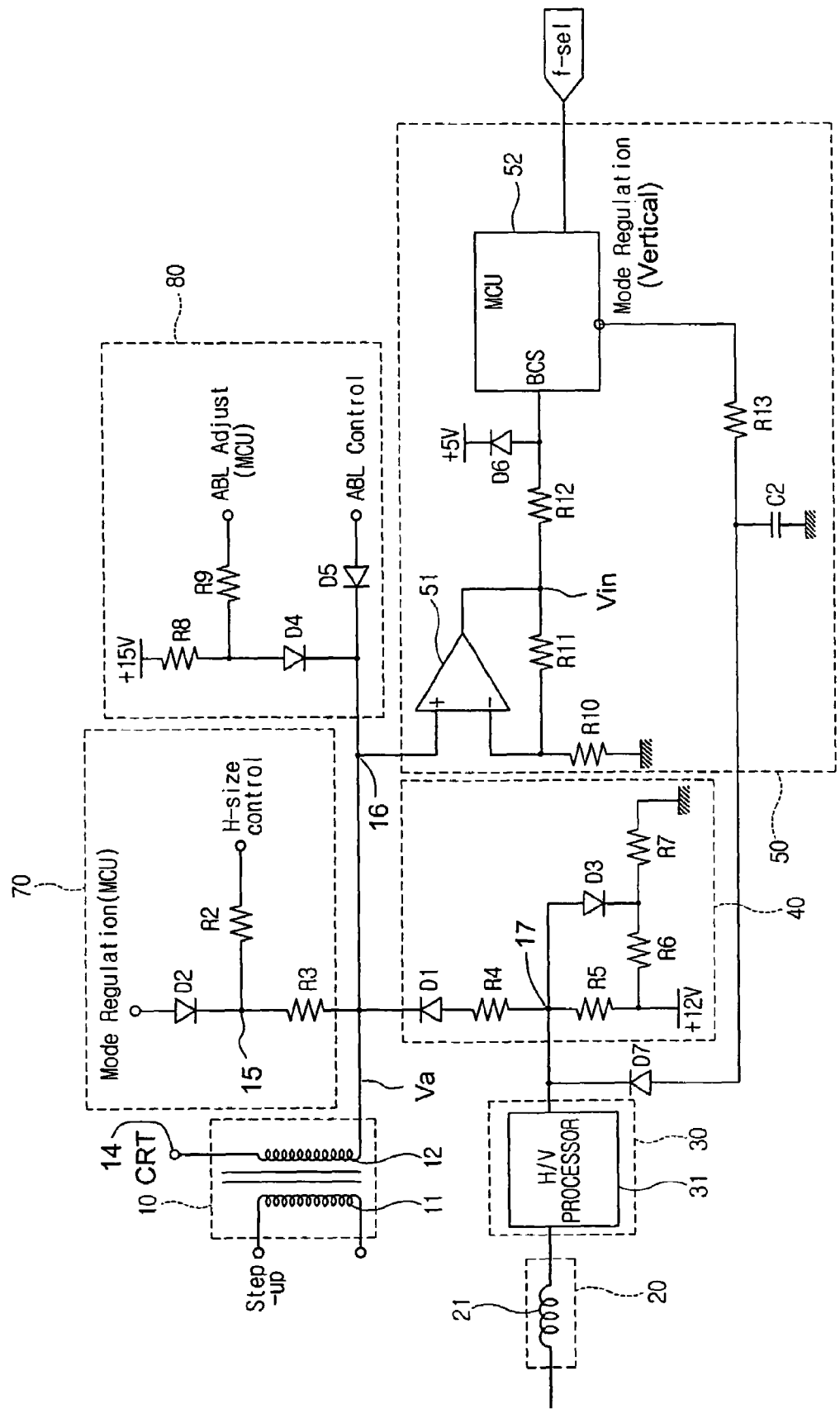
FIG. 3 is a circuit diagram of an embodiment of the CRT display apparatus according to the present invention.

FIG. 3 is a circuit diagram of the CRT display apparatus according to another embodiment of the present invention. As shown in FIG. 3, the CRT display apparatus comprises the FBT 10, a horizontal regulator 70, an ABL adjuster 80, the vertical regulator 30, the brightness change sensor 40, the brightness change compensator 50, and the frequency elector 60 (FIG. 2).

The FBT 10 comprises the first induction coil 11 and the secondary induction coil 12, wherein the secondary induction coil 12 has the output terminal electrically connected to the CRT, and the input terminal 16 electrically connected to the horizontal regulating part 70, the ABL adjuster 80, the brightness change sensor 40, and the brightness change compensator 50. In the FBT 10, voltage applied to the primary induction coil 11 is amplified in the secondary induction coil 12, and then supplied to the anode of the CRT. Here, a voltage of 50 to 180 V is applied from the step-up circuit to the primary induction coil 11, and inducing a high voltage of about 25 kV in the secondary induction coil 12.

The horizontal regulating part 70 and the ABL adjuster 80 sense the voltage applied to the input terminal 16 of the secondary induction coil 12 of the FBT 10 according to the brightness change, thereby regulating the H-size of the screen and the current of the electron beam, respectively.

The vertical regulator 30 comprises the H/V processor 31, wherein the H/V processor 31 receives information on a predetermined voltage and outputs the sawtooth wave current to the vertical deflection coil 21.

The brightness change sensor 40 comprises resistors R4, R5, R6 and R7 and diodes D1 and D3. A voltage of, e.g., 12 V applied to the resistor R5 is compared with the voltage applied to the input terminal 16, and then a feedback due to the voltage at a node 17 is input to the H/V processor 31 to generate a current in the vertical deflection coil 21.

The brightness change compensator 50 comprises an amplifier 51, resistors R10, R11, R12 and R13, a diode D6, a capacitance C2, and an MCU 52.

When the voltage applied to the input terminal 16 of the secondary induction coil 12 is applied to a non-inverting terminal of the amplifier 51, the amplifier 51 outputs an amplified voltage Vin to the resistor R12 which operates as a pull-up resistor, wherein the amplified voltage is approximately calculated as follows:

$$Vin = \left(1 + \frac{R11}{R10}\right)Va,$$

where, Va is the voltage applied to the input terminal 16 of the secondary induction coil 12, and Vin is the voltage output from the amplifier 51 and input to a beam current sense (BCS) terminal of the MCU 52 provided in the brightness change compensator 50.

The amplified voltage is compared with a voltage, e.g., +5 V so as to be controlled in current, and then applied to the BCS terminal of the MCU 52.

The MCU 52 outputs the compensating value due to the brightness change based on the voltage applied to the BCS terminal. Herein, the compensating value is calculated as follows:

$$Y = Xf + \frac{A}{Vin},$$

where, Y is a final compensating value output from the brightness change compensator 50, Vin is the voltage output from the amplifier 51 and input to the MCU 52 through the BCS terminal; Xf is a compensating value taken from an average value of experimental data according to the frequency of the scanning line with respect to several CRT display apparatuses; and A is a constant relative to a specification size of the screen, e.g., 15 inch, 17 inch, 19 inch, etc., according to a circuit characteristic of a respective CRT display apparatus, which cooperates with the Vin and is used in compensating the brightness change.

When the brightness is increased, the beam current is increased, so that the Vin is lowered under constant power. In the case of the high brightness, the voltage applied to the anode of the CRT is increased but the current flowing in the deflection coil is decreased, so that the size of the screen is decreased. In this case, the size of the screen is maintained by outputting a value inversely proportion to the Vin, and increasing the amplitude of the current flowing from the H/V processor 31 to the deflection coil 21.

The compensating value outputted from the MCU 52 is nonlinear, and is determined according to the frequency of the scanning line, the specification size of the screen, and the circuit characteristic. Various compensating values Xf may be stored in a table according to frequency, and the final compensating value may be output in consideration of the compensating value corresponding to the Vin.

The compensating value output from the MCU 52 is filtered by the resistor R13 and the capacitance C2, and then input to the H/V processor 31 through the diode D7.

The MCU 52 preferably receives information "f-sel" on the frequency of the scanning line from the frequency elector 60 (FIG. 2) to selectively output the compensating value Xf.

Figure 4:
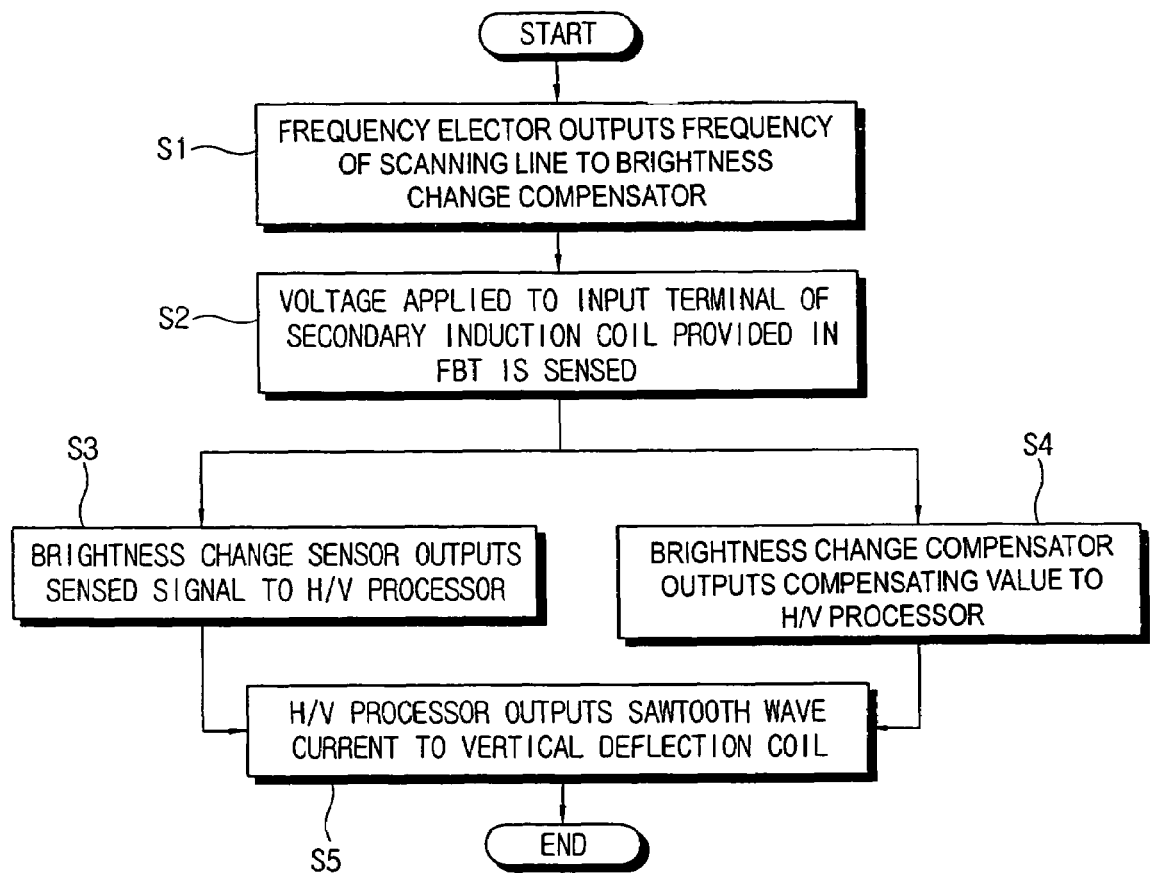
FIG. 4 is a control flowchart of the CRT display apparatus according to the present invention.

FIG. 4 is a control flowchart of the CRT display apparatus according to the present invention. Referring to FIGS. 3 and 4, at operation S1, the MCU 52 receives the information on the frequency of the scanning line (f-sel) selected in the frequency elector (not shown). At operation S2, the voltage applied to the input terminal 16 of the secondary induction coil 12 is sensed to determine the brightness of the screen.

When the brightness of the screen is changed, the voltage applied to the input terminal 16 of the secondary induction coil 12 fluctuates. In the case where the screen gets brighter and therefore the voltage applied to the input terminal 16 is decreased, the horizontal regulating part 70 increases the H-size of the screen responding to the voltage decrease of the input terminal 16 based on the ratio of the resistors R2 and R3 to minimize the size fluctuation due to the brightness increase. Then, the MCU of the horizontal regulating part 70 applies a preset voltage according to the frequencies to the terminal 15, thereby compensating the H-size fluctuation of the screen.

At operation S3, the brightness change sensor 40 inputs a voltage determined in part by a ratio of the resistors R4 and R5 to the H/V processor 31 in response to the voltage applied to the input terminal 16. At operation S4, the brightness change compensator 50 precisely compensates the control signal of the H/V processor 31 according to the brightness change in consideration of the voltage applied to the input terminal 16 of the secondary induction coil 12, the frequency of the scanning line, the specification size of a screen, etc.

At operation S5, the H/V processor 31 outputs the sawtooth wave current to the vertical deflection coil 21 in response to the control signal, thereby preventing the V-size of the screen from fluctuating corresponding to the brightness change.

In the above-described embodiment, the input terminal 16 of the secondary induction coil 12 provided in the FBT 10 is employed as a terminal for sensing the brightness change. Alternatively, the brightness change may be sensed at another suitable node.

Further, the method of controlling the V-size of the screen may be similarly applied to controlling the horizontal size (H-size) of the screen.

As described above, the present invention provides a CRT display apparatus and a control method thereof, which minimizes a V-size fluctuation due to a brightness change without deviation according to a type of the CRT display apparatus.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A CRT display apparatus having a cathode ray tube (CRT), a flyback transformer (FBT) which amplifies an input voltage and outputs the amplified voltage to an anode of a CRT, a vertical regulator to regulate a vertical size (V-size) of a screen of the CRT, and a vertical deflector which vertically deflects a scanning line, the CRT display apparatus comprising:

a brightness change sensor which senses a voltage applied to an input terminal of a secondary induction coil of the FBT and outputs a sensed signal to the vertical regulator; and a brightness change compensator which outputs a compensating value to the vertical regulator based on the voltage applied to the input terminal, a frequency of the scanning line, and a specification size of the screen to compensate for a brightness change.

2. The CRT display apparatus according to claim 1, wherein the compensating value output from the brightness change compensator is inversely proportional to the voltage applied to the input terminal, and is directly proportional to the frequency of the scanning line and to a circuit constant relative to the specification size of the screen.

3. The CRT display apparatus according to claim 1, wherein the brightness change compensator comprises an amplifier which amplifies the voltage applied to the input terminal of the secondary induction coil, and outputs the compensating value which is calculated according to an equation:

$$Y = Xf + \frac{A}{Vin},$$

where, Y is a final compensating value output from the brightness change compensator, Xf is a compensating value according to the frequency of the scanning line, A is a constant relative to the specification size of the screen and a circuit characteristic of the CRT display apparatus, and Vin is the voltage output from the amplifier.

4. The CRT display apparatus according to claim 1, further comprising a frequency elector which outputs the frequency of the scanning line to the brightness change compensator based on the frequency of the scanning line selected by a user.

5. The CRT display apparatus according to claim 2, further comprising a frequency elector which outputs the frequency of the scanning line to the brightness change compensator based on the frequency of the scanning line selected by a user.

6. The CRT display apparatus according to claim 3, further comprising a frequency elector which outputs the frequency of the scanning line to the brightness change compensator based on the frequency of the scanning line selected by a user.

7. The CRT display apparatus according to claim 1, wherein the vertical regulator regulates an amplitude of a sawtooth wave current flowing in the vertical deflector according to signals received from the brightness change sensor and the brightness change compensator to prevent fluctuations of a vertical size of the screen.

8. The CRT display apparatus according to claim 2, wherein the vertical regulator regulates an amplitude of a sawtooth wave current flowing in the vertical deflector according to signals received from the brightness change sensor and the brightness change compensator to prevent fluctuations of a vertical size of the screen.

9. The CRT display apparatus according to claim 3, wherein the vertical regulator regulates an amplitude of a sawtooth wave current flowing in the vertical deflector according to signals received from the brightness change sensor and the brightness change compensator to prevent fluctuations of a vertical size of the screen.

10. A method of controlling a CRT display apparatus having a flyback transformer (FBT) which amplifies an input voltage and outputs the amplified voltage to an anode of a CRT, and a vertical deflector which vertically deflects a scanning line, the method comprising:

sensing a voltage applied to an input terminal of a secondary induction coil of the FBT; and compensating for a brightness change of a screen of the CRT based on the sensed input voltage, a frequency of the scanning line, and a specification size of the screen of the CRT.

11. The method according to claim 10, wherein the method further comprises:

amplifying the sensed input voltage; and compensating the brightness based on a compensating value which is calculated according to an equation:

$$Y = Xf + \frac{A}{Vin},$$

where, Y is a final compensating value, Xf is a compensating value according to the frequency of the scanning line, A is a constant relative to the specification size of the screen and a circuit characteristic of the CRT display, and Vin is the amplified sensed input voltage.

12. The method according to claim 10, further comprising:

providing a user operable input to select the frequency of the scanning line; and compensating for the brightness change based on a user selected frequency of the scanning line.

13. The method according to claim 11, further comprising:

providing a user operable input to select the frequency of the scanning line; and compensating for the brightness change based on a user selected frequency of the scanning line.

14. The method according to claim 10, further comprising:

regulating an amplitude of a sawtooth wave current flowing in the vertical deflector based on the sensed input voltage and the calculated compensating value to prevent a vertical size of the screen from fluctuating.

15. The method according to claim 11, further comprising:

regulating an amplitude of a sawtooth wave current flowing in the vertical deflector based on the sensed input voltage and the calculated compensating value to prevent a vertical size of the screen from fluctuating.

16. A CRT display apparatus, comprising:

a cathode rat tube (CRT) having a display screen, a flyback transformer (FBT) comprising an input induction coil and a secondary induction coil, and which amplifies an input voltage and outputs the amplified voltage from a first end of the secondary induction coil to an anode of the CRT;

a vertical regulator which regulates a vertical size of the screen of the CRT;

a vertical deflector which vertically deflects a scanning line of the CRT;

a brightness change sensor which senses a voltage applied to a second end of the secondary induction coil and outputs a control signal to the vertical regulator based on the sensed voltage; and a brightness change compensator which outputs a compensating value to the vertical regulator based on the control signal, a frequency of the scanning line, a specification size of the display screen of the CRT and characteristics of the display apparatus, to compensate a brightness change.

17. The CRT display apparatus according to claim 16, further comprising:

a data storage table which stores a plurality of compensating values corresponding respectively to a plurality of scanning line frequencies and a plurality of values of the sensed voltage, wherein the brightness compensator outputs the compensating value by selecting a value from the table based on the sensed voltage and the frequency of the scanning line.

* * * * *

UNITED STATES PATENT AND TRADEMARK OFFICE
CERTIFICATE OF CORRECTION

| | | |
|---|---|---|
| PATENT NO. | : 6,987,362 B2 | Page 1 of 1 |
| APPLICATION NO. | : 10/795250 | |
| DATED | : January 17, 2006 | |
| INVENTOR(S) | : Seok-joo Han | |

It is certified that error appears in the above-identified patent and that said Letters Patent is hereby corrected as shown below:

On the Front Page, U.S. Patent Applications, Column 2, line 6, replace "Moribe" with --Moribe et al.--, therefor;

Foreign Patent Documents, Column 2, line 1, after "8/1993" insert --H04N3 185--;

line 2, after "12/1993" insert --H0493 185--;

line 3, after "2/19937" insert --H0493 185--;

Column 8, line 7, claim 1, delete "the" before "voltage".

Signed and Sealed this

Fifteenth Day of August, 2006

JON W. DUDAS
*Director of the United States Patent and Trademark Office*